April 7, 1931. E. R. GREER 1,799,846
TRACTOR HITCH
Filed May 9, 1925 3 Sheets-Sheet 1
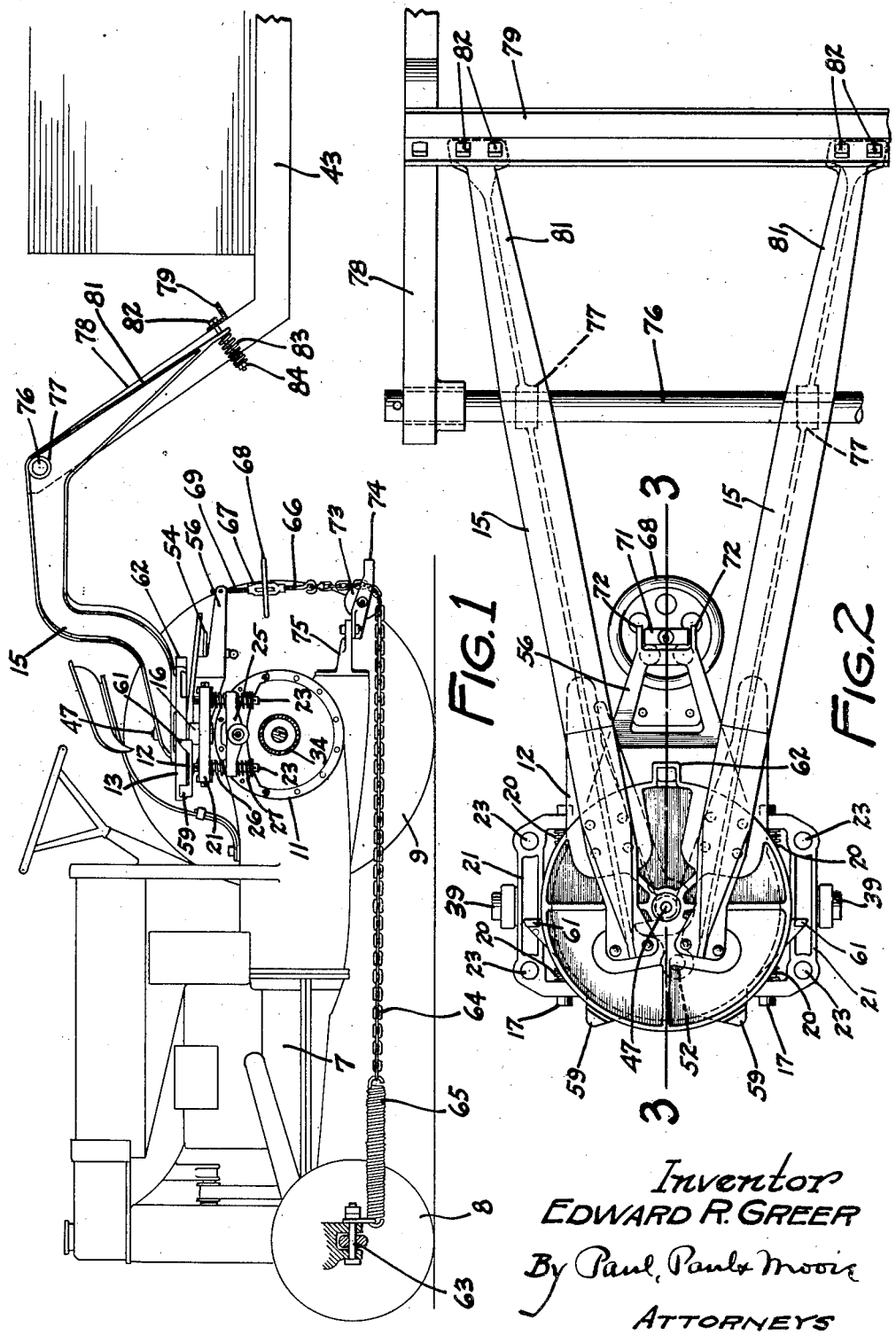
Inventor
EDWARD R. GREER
By Paul, Paul & Moore
Attorneys April 7, 1931.  E. R. GREER  1,799,846
TRACTOR HITCH
Filed May 9, 1925  3 Sheets-Sheet 2

Inventor
EDWARD R. GREER
By Paul, Paulo Moore
ATTORNEYS

April 7, 1931.  E. R. GREER  1,799,846
TRACTOR HITCH
Filed May 9, 1925    3 Sheets-Sheet 3

Inventor
EDWARD R. GREER
By Paul, Paulo Moore
ATTORNEYS

Patented Apr. 7, 1931

1,799,846

UNITED STATES PATENT OFFICE

EDWARD R. GREER, OF MINNEAPOLIS, MINNESOTA

TRACTOR HITCH

Application filed May 9, 1925. Serial No. 29,129.

This invention relates to new and useful improvements in tractor hitches, and more particularly relates to such an apparatus which is an improvement over the form shown in my prior pending application, Serial No. 606,117 filed December 11th, 1922.

The object of this invention is to provide a tractor hitch having a forked coupling member or plate pivotally and yieldably mounted upon the tractor housing, and which plate is adapted to detachably receive a king pin or bolt carried by the coupling member or plate secured to the forward end of the trailer frame, or other device to be connected thereto.

A further object of the invention is to provide such a hitch or coupling having means for limiting the turning movement of the tractor with relation to the trailer, and also having means for limiting the tilting movement of the coupling member or plate mounted upon the tractor and thereby preventing possible injury to the operator should the rear wheels drop into a deep hole in the roadway or ground surface, which would cause the tractor and trailer to buckle at the point where they are coupled together.

A further object is to provide a tractor hitch having means for preventing the front end of the tractor from rearing up or lifting off the ground, and which means also functions as a truss to support the rear tractor housing.

A further object resides in the novel method of mounting and securing the tractor hitch or coupling to the rear tractor housing which functions to minimize strains exerted on the housing as a result of the load carried by the trailer.

A further object is to provide a tractor or trailer hitch comprising a pair of diverging beams which are pivotally and yieldably secured to the forward end portion of the trailer frame in such a manner as to cushion the trailer and which connection also functions as a means to cushion the draw bar pull when starting a heavy load.

The particular object of the invention, therefore, is to provide an improved tractor hitch or coupling.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a view in side elevation of a common form of tractor showing the improved hitch mounted thereon and also showing the forward end portion of a trailer connected thereto;

Figure 2 is a plan view of the hitch and the diverging beams connected to the forward end of the trailer frame;

Figure 4:
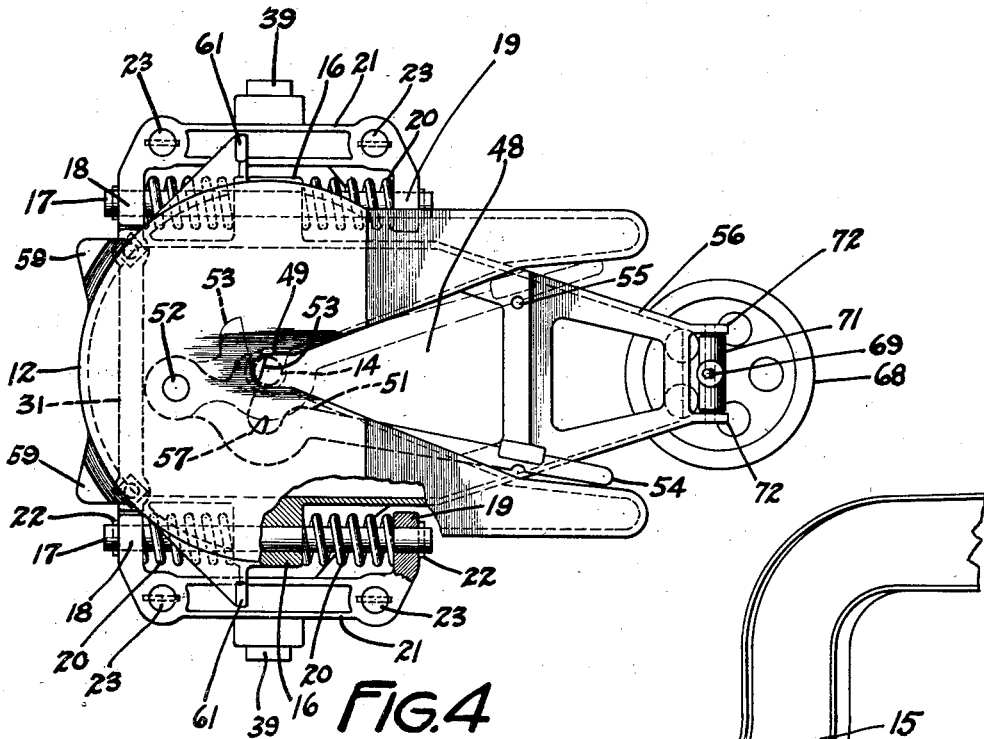
Figure 4 is a plan view, partially broken away, of the forked coupling member or plate which is pivotally and yieldably mounted upon the tractor housing.

In the selected embodiment of the invention here shown, for purposes of disclosure, there is illustrated a common form of tractor such as the well-known Fordson comprising the body 7, front and rear wheels 8 and 9 and the rear axle housing 11.

In the novel tractor hitch or coupling featured in this invention the complementary coupling plates or members 12 and 13 are in the reverse order of that shown in the above mentioned application; that is, the fifth wheel or circular plate 13 carrying the king pin 14, is mounted upon the diverging beams 15 of the trailer instead of being mounted upon the tractor housing, and in like manner the forked coupling plate 12 is pivotally mounted upon the tractor housing instead of being carried by the beams 15.

Figure 3:
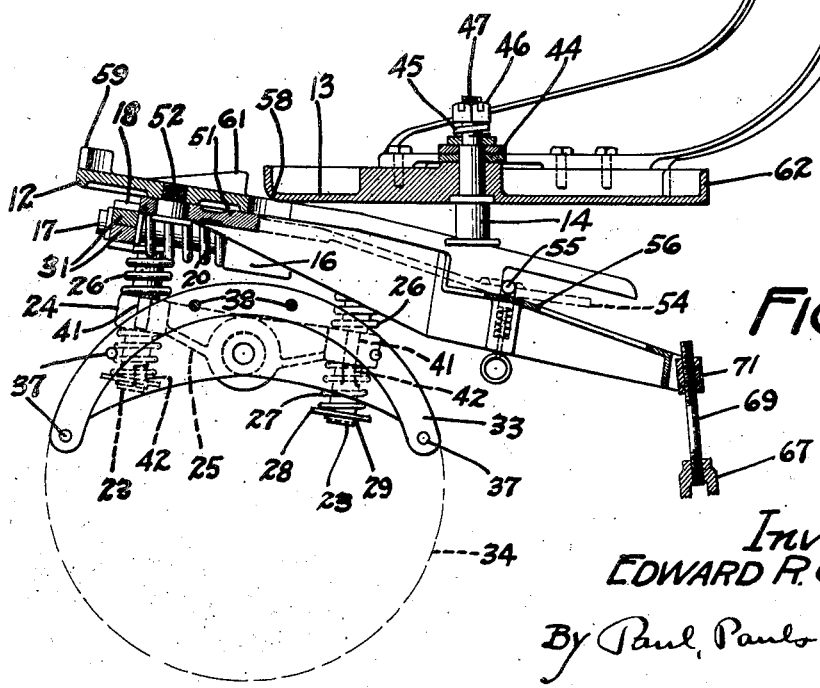
Figure 3 is an enlarged sectional view on the line 3—3 of Figure 2, showing the normal position of the coupling members before being coupled together.
Figure 6:
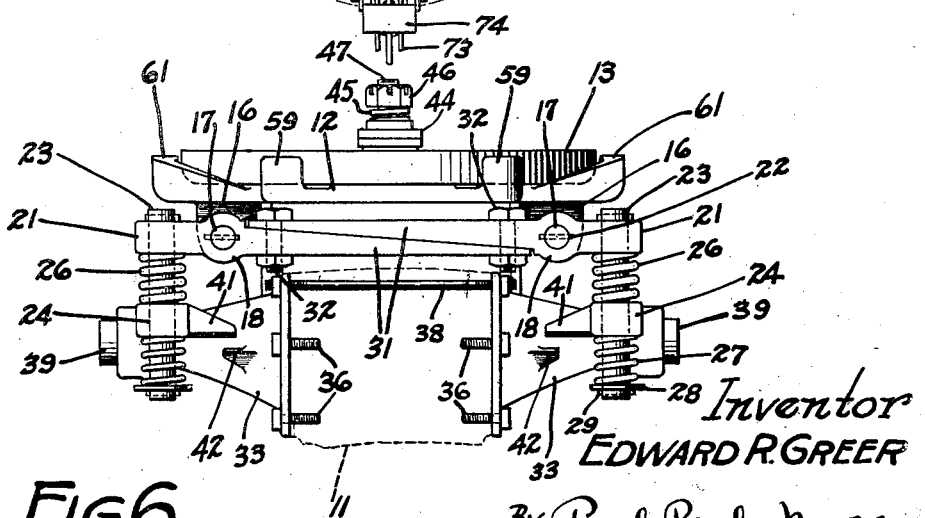
Figure 6 is a front view of the device with the diverging beams omitted, showing the preferred method of mounting the same upon the tractor housing.

Referring to Figures 3 and 6 it will be noted that the forked coupling plate 12 is provided with a pair of depending lugs 16 which are bored out to receive the short shafts or rods 17, having their ends mounted in inwardly extending lugs 18 and 19 provided in the opposed brackets 21. Suitable pins 22 are provided in the ends of the rods 17 to prevent longitudinal movement of the rods 18 and 19. Coiled compression springs 20 are mounted on the shafts 17 on opposite sides of the lugs 16, and function as a means to cushion the draw bar pull on the trailer and to prevent shocks from being transmitted thereto.

Figure 5:
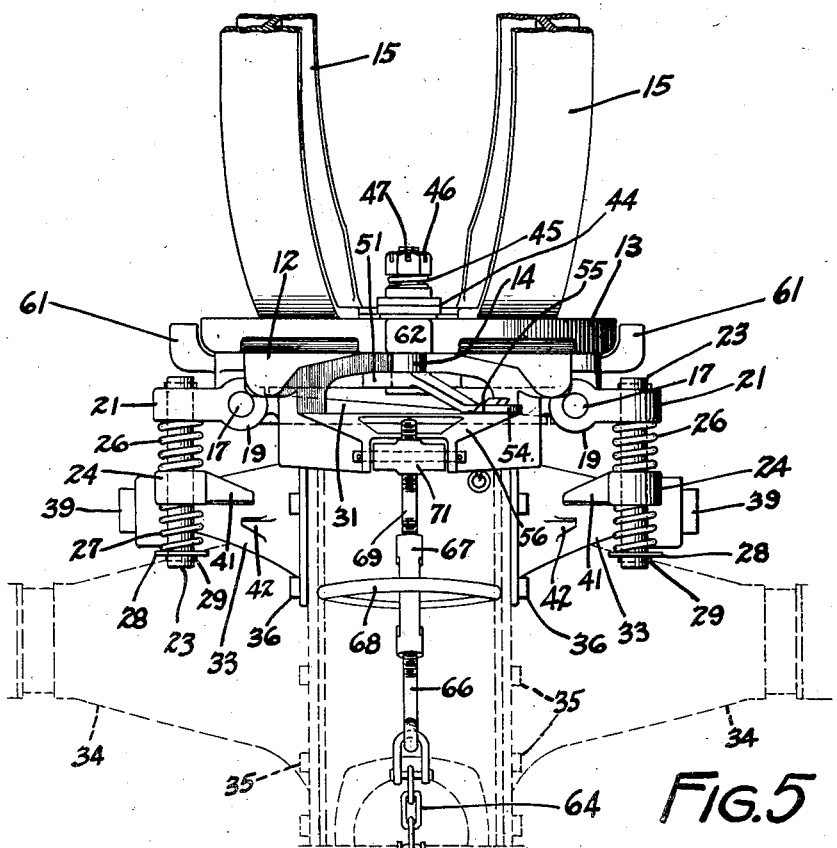
Figure 5 is a rear view of the hitch showing the two members coupled together.

The means provided for yieldably and pivotally mounting the brackets 21 and, therefore, the lower coupling plate 12 upon the rear tractor housing 11 preferably consists in the provision of a plurality of upright rods 23 having their upper ends mounted in the brackets 21, and which downwardly extend therefrom through vertical guides 24 terminally provided in the opposed rock members 25, as particularly shown in Figures 3, 5 and 6. The springs 27 also function to cushion the rebound of the rods 23, after the springs 26 have been compressed from passing over a bump or depression. Suitable compression springs 26 are interposed between the brackets 21 and the upper faces of the guides 24. These compression springs function to carry the weight and load of the forward end of the trailer when connected to the tractor, thereby providing a cushion therefor.

Referring to Figures 5 and 6, it will be noted that the upright rods 23 downwardly project through the guides 24 a distance sufficient to receive the relatively lighter compression springs 27. These springs are retained upon the lower end portions of the rods 23 by means of washers 28 and the pins 29. The springs 27 function to resist upward movement of the rods 23 when a twisting strain is exerted upon the hitch or coupling as when one wheel of the tractor or trailer drops into a depression in the roadway or passes over a high spot.

In the above construction it is to be understood that the guides 24 in the rock members 25 are provided with sufficient clearance to allow the rods 23 free movement therein when the tractor and trailer are passing over rough surfaces.

In order to resist the twisting strain or action exerted upon the brackets 21, as a result of the horizontal rods 17 being off-set or out of alignment with the upright rods 23 as shown in Figures 4, 5 and 6. The forward lugs 18 of the brackets 21 are preferably provided with inwardly projecting extensions 31, which are adapted to be coupled together as shown in Figure 6. Suitable bolts 32 are provided for rigidly bolting the two extensions 31 together, so that the two brackets 21 may function as a unitary structure. By thus connecting the two brackets 21 together it will readily be seen that the brackets 21 will be retained in true vertical alignment with the rods 23 so that there will be no binding action of the rods therein.

An important feature of this invention resides in the novel means provided for mounting and securing the tractor hitch or coupling to the rear tractor housing 11. Such means preferably consists in the provision of a pair of supporting brackets 33 which are formed to fit the circular portion of the housing as shown in Figure 1. The rear end portion of the tractor usually comprises the opposed axle housings 34, which are suitably secured to the main housing 11 by means of cap screws 35 as shown in Figure 5. In mounting the supporting brackets 33 upon the rear end portion of the tractor, the cap screw 35 in the upper portion of the axle housings 34 are removed and the brackets 33 mounted upon the annular flanges of the axle housings as shown in Figures 1, 3 and 5, after which suitable cap screws 36 will be mounted in the apertures 37 of the brackets 33, and will be received in the threaded sockets from which the usual cap screws 35 were removed. In place of providing cap screws in the uppermost portions of the brackets 33 suitable tie rods or bolts 38 are provided which pass through the flanges in the brackets 33 and clear through the housing 11 as shown in Figure 6. In this figure the tractor housing 11 is indicated by dotted lines.

By this novel method of securing the supporting brackets 33 to the tractor housing, the brackets and the bolts 38 will form, in effect, a yoke carried by the housing 11. As a result of the bolts 38 extending clear through the upper portion of the housing 11 and having their ends secured to the flanges of the brackets 33 no outward or tensile strain will be exerted on the housing as such strain will all be taken up by the bolts 38. The cap screws 36 securing the lower portions of the brackets 33 to the housing will not be subjected to the tensile strain, as a result of the load being carried at the upper ends of the brackets, thereby causing the lower portions thereof to be inwardly forced against the tractor housing. The rock members 25 are pivotally mounted upon suitable studs 39 which are terminally mounted in the supporting brackets 33.

Another feature of this invention resides in the means provided for limiting the tilting movement of the rock members 25 upon the studs 39. Such means preferably consist in providing each of the rock members 25 with a pair of inwardly projecting lugs 41 adapted to engage lugs 42 provided in each of the brackets 33 (see Figures 3, 5 and 6). By the provision of these stop lugs, it will be impossible for the tractor and trailer to buckle at the point where they are coupled together, which might result in serious injury to the operator should the rear wheels of the tractor drop into a comparatively deep hole or depression in the roadway, which, it will be noted by Figure 1, would cause the operator to become wedged between the steering wheel of the tractor and the diverging beams 15. The stop lugs 41 and 42 are, therefore, made sufficiently strong to substantially carry the rear end portion of the tractor and the forward end portion of the trailer frame 43 should the rear wheels of the tractor thus drop into a depression in the roadway.

The upper portion or fifth wheel 13 of this novel hitch is here shown as being mounted upon and secured to the forward end-portions of the diverging beams 15, which are connected to the trailer frame as shown in Figures 1 and 2. This circular plate or fifth wheel 13 has the usual king pin or draft pin 14 mounted therein as particularly shown in Figure 3. The king pin 14 is preferably provided with a pair of thrust washers 44 and a spring washer 45, which is engaged by the nut 46 terminally mounted upon the upper threaded end portion 47 of the king pin. The lower coupling plate 12 is preferably provided with a triangular opening or slot 48 terminating in a reduced portion 49. The inclined sides of the triangular opening 48 function to guide the king pin into the restricted portion 49 which preferably is of such size as to loosely fit the body of the king pin 14 when seated therein as indicated by the dotted lines in Figure 4. A locking latch 51 is mounted beneath the plate 12 and has one end pivotally connected thereto by means of a shouldered stud 52 as particularly shown in Figure 3. This latch is provided with a lug 53 which, when the latch is in open position, as shown in Figure 4, will overhang the restricted portion 49 of the triangular opening 48 so that it will be in the path of the king pin 14 to be engaged thereby when the latter is moved into locking engagement with the lower plate 12. Such engagement of the king pin 14 with the lug 53 will cause the latch to be swung from the full line to the dotted line position shown in Figure 4, in which position the end portion 54 of the latch will be moved into locking engagement with a spring bolt 55 mounted in the A-shaped frame 56 rearwardly and downwardly extending from the lower face of the lower coupling plate 12. When the latch 51 has thus been moved from locking to unlocking position by the king pin engaging the lug 53, the king pin will be locked to the lower plate 12 as a result of the spring bolt 55 preventing the latch from being moved out of locking engagement therewith. When the latch has been moved into locking position to secure the king pin 14 to the lower coupling plate 12 the pin will be seated in a recess 57 provided in the latch thereby providing substantially an angular bearing for the king pin when in locking operative position. The means provided for causing the latch to be swung into locking position when the lug 53 is engaged by the king pin, consists in mounting the stud 52, securing the latch to the plate 12, out of alignment with the triangular slot 48 as particularly shown in Figure 4. By thus locating the stud 52 out of alignment with the triangular slot 48, engagement of the king pin with the lug 53 will readily cause the latch to be automatically swung into locking position thereby securely connecting the trailer to the tractor.

The forward portion of the circular plate or fifth wheel 13 is preferably rounded as indicated at 58, so that when the plate engages the lower coupling plate 12, it will readily slide upwardly over the inclined surface thereof until the weight of the forward end of the trailer will cause the lower plate to be tilted to a horizontal position as shown in Figure 1, thereby allowing the king pin 14 to be moved into engagement with the latch 51. A pair of upwardly extending lugs 59 are preferably provided on the forward portion of the lower coupling plate 12 to provide means for limiting the forward movement of the upper coupling plate 13 should the king pin accidentally fail to be received in the restricted portion 49 of the slot 48. Means are also provided on the coupling plates 12 and 13 to limit the turning movement of the tractor with relation to the trailer. Such means preferably consists in providing an outwardly and upwardly extending lug 61 on each side of the lower coupling plate 12. These lugs are adapted to be engaged by a lug 62 centrally provided on the upper circular coupling plate 13, as particularly shown in Figures 2, 3 and 5. These lugs are preferably so arranged that the tractor may be turned approximately at right angles to the trailer.

Another feature of the invention resides in the means provided for preventing the front end of the tractor from rearing up or lifting off the ground when the tractor is pulling a heavy load. Such means preferably consists in yieldably connecting the front axle 63 of the tractor with the lower coupling plate 12 as shown in Figure 1. The means provided for thus connecting the front end of the tractor to the trailer hitch or coupling members, preferably consists of a suitable cable or chain 64, having one end secured to one end of a coiled tension spring 65, and its other end secured to an eye-bolt 66, which is received in threaded engagement in a turn buckle 67 having a hand wheel 68 provided thereon for conveniently rotating the turn buckle to adjust the tension of the spring 65. A threaded rod 69 is mounted in the upper end of the turn buckle 67 and has its other end secured to a swivel block 71, as shown in Figures 3 and 5. This swivel block is mounted in a pair of lugs 72 provided on the A-shaped frame 56 as particularly shown in Figure 4. The tension spring 65 has its opposite end suitably secured to the front axle 63 of the tractor as shown in Figure 1. A sheave 73 is mounted in a bracket 74 supported upon a bracket 75 secured to the rear end-portion of the tractor housing as shown in Figure 1. This sheave is so located that when the chain 64 is mounted thereon as shown in Figure 1 the horizontal portion thereof, extending under the tractor frame, will clear the rear tractor housing as shown. By thus mounting the chain 64 it will be noted that it will form, in effect, a truss exerting an upward or lifting force against the rear tractor housing, such force being increased as the tension of the spring is increased by adjustment of the turn buckle 67, and also when the forward end of the tractor tends to lift or rear up, caused by the tractor hauling a heavy load. When the tractor is hauling a heavy load the forward pull or force exerted against the hitch at a point above the axis of the rear tractor axle will cause the front end of the tractor to tend to lift, swinging about the rear axle as a center. Such swinging or lifting of the front end of the tractor will cause the spring 65 to be elongated as a result of the rear end of the chain being indirectly secured to the rear end of the A frame 56, which cannot be tilted with the tractor as a result of the two coupling plates 12 and 13 being locked together by the king pin and the latch 51. Therefore, it will readily be seen by reference to Figure 1 that when the tension of the spring 65 is adjusted to the proper degree by means of the turn buckle 67 it will be practically impossible for the front end of the tractor to rear up or lift off the ground when hauling a heavy load.

Another feature of this invention resides in the novel method employed in pivotally and yieldably securing the trailer frame to the diverging beams 15. Referring to Figure 1, it will be noted that the beams 15 are preferably arched as shown in order to provide ample clearance for the rear wheels 9 of the tractor when turning sharp corners.

A shaft 76 is preferably mounted in sockets 77 provided in the upper horizontal portion of the beams 15. The opposed side beams of the trailer frame 43 have their forwardly inclined end portions 78 pivotally connected to the shaft 76 as shown in Figure 2. An angle bar 79 is mounted upon the inclined end portion 78 of the trailer frame to provide a means for connecting to the trailer frame, the downwardly and rearwardly extending end portions 81 of the diverging beams 15.

Referring to Figure 1 it will be noted that the lower terminals of the end portions 81 of the diverging beams are yieldably connected to the cross beam 79 by means of bolts 82 having suitable compression springs 83 mounted and retained thereon by means of the nuts and washers 84 as shown. By this novel method of connecting the beams 15 to the trailer frame 43 it will be noted that the springs 83 will function as a cushion for the load carried by the forward portion of the trailer as a downward force exerted upon the trailer frame adjacent the cross bar 79 and will cause the diverging beams to slightly oscillate upon the studs 39 of the brackets 33, which will cause the upper ends of the trailer frame to slightly oscillate upon the cross-shaft 76, thereby causing the lower ends of the end portions 81 of the diverging beams to be moved away from the cross bar 79 as shown in Figure 1. The springs 83 also function to cushion the draw bar pull on the diverging beams 15 when the tractor is suddenly started and the trailer is loaded.

In the operation of this novel tractor hitch or coupling the lower coupling plate 12, when not connected to the upper plate 13 of the trailer, will be carried in an inclined position as shown in Figure 3, caused by the action of the spring 65 at the forward end of the tractor. When thus positioned the lugs 41 on the rocking members 25 will be in engagement with the rear stop lugs 42 provided on the supporting brackets 33. When it is desired to couple the tractor to the trailer, the tractor will be rearwardly moved until the coupling plate 12 passes under the plate 13 as shown in Figure 3. It is to be understood, of course, that the forward end of the trailer will be provided with suitable means for supporting it when disconnected from the tractor. Such means are common and it is, therefore, thought unnecessary to show same in the drawings, as it forms no part of the present invention.

As the coupling plate 12 is moved under the plate 13 the latter will engage the upper surface thereof, thereby slightly raising or lifting the forward end of the trailer frame so that the weight thereof exerted against the lower coupling plate 12, will cause the latter to be moved into a horizontal position as shown in Figure 1. As the two coupling plates are thus moved into alignment with each other the king pin 14 will be moved into engagement with the lug 53 on the latch 51 thereby causing the latter to be swung into locking position back of the spring bolt 55, after which the two coupling plates will be securely locked together.

When the coupling members have thus been coupled together, and the tractor and trailer are traveling along the roadway, the springs 20, coiled about the rods or shafts 17 as shown in Figure 4, will function to cushion the draw bar pull on the trailer. Also as a result of these springs any sudden jolt or jar imparted to either the trailer or the tractor when traveling along the roadway will be absorbed by the springs 20, thereby eliminating such shocks from being transmitted from the tractor to the trailer, or vice versa. The coiled springs 26 are adapted to carry the weight and load of the forward end of the trailer. The springs 27 beneath the heavy springs 26 function as a means to resist the upward movement of the coupling members when passing over rough surfaces. By means of this novel construction it will, therefore, readily be seen that the movement of the trailer will be free and unrestricted as the springs 26 and 27 will compensate for any variation in the transverse tilting or rocking of the tractor.

The above construction, therefore, will prevent any severe torque strains from being transmitted to the diverging beams 15 and therefore the trailer frame, thereby providing an apparatus which is well adapted for use in hauling heavy loads over rough roadways.

When it is desired to disconnect the trailer from the tractor the spring bolt 55 is moved out of the path of the lever 54 of the latch 51, after which the latch may readily and conveniently be swung into unlocking position as shown in full lines in Figure 4, thereby disconnecting the trailer from the tractor.

Having thus described my invention what I claim as new and desire to secure by Letters-Patent, is:

1. A tractor hitch including a member adapted to be secured to a trailer, an element adapted to be mounted to rock upon the tractor, means to connect the member and element to maintain the element in normal position and to permit relative pivotal movement upon turning travel of the tractor, and tension means connected to the element and to the forward portion of the tractor to exert a downward force thereon.

2. A tractor hitch including a member adapted to be secured to a trailer, an element adapted to be mounted to rock upon the tractor, means to connect the member and element to maintain the element in normal position and to permit relative pivotal movement upon turning travel of the tractor, tension means connected to the element and to the forward portion of the tractor to exert a downward force thereon, and said tension means also having a connection with the tractor housing below and rearward of the drive axle thereof.

3. A tractor hitch including a member adapted to be secured to a trailer, an element adapted to be mounted to rock upon the tractor, means to connect the member and element to maintain the element in normal position and to permit relative pivotal movement upon turning travel of the tractor, and tension means connected to the element and to the forward axle of the tractor whereby a downward force will be exerted on the forward portion of the tractor.

4. A tractor hitch including a member adapted to be secured to a trailer, a rocker mounted on the tractor, guide pins having vertical movement in said rocker, compression springs above and below the bearings of said pins in said rocker, an element connected with said pins and cooperating with said rocker to tension said springs, and means to connect the member and element to maintain the element in normal position and to permit relative pivotal movement upon turning travel of the tractor.

5. A tractor hitch including a member adapted to be secured to a trailer, brackets secured to the tractor, rockers pivotally mounted upon said brackets, rods guidingly supported in the opposite ends of said rockers, an element connected with the upper ends of said rods and adapted for movement lengthwise of the tractor, means for connecting the member and element to permit relative pivotal movement upon turning travel of the tractor, and stops for limiting the movement of said rockers.

6. A tractor hitch including a member adapted to be secured to a trailer, rockers pivotally mounted upon the tractor, rods guidingly supported in the ends of said rockers, brackets connecting together the upper ends of the rods in each rocker, an element mounted upon said brackets and adapted for movement with respect thereto, and means for detachably connecting the member with said element and permitting relative pivotal movement upon turning travel of the tractor.

7. A tractor hitch including a circular member adapted to be secured to a trailer, rockers pivotally mounted upon the tractor, rods guidingly supported in the opposite ends of said rockers, brackets securing together the upper ends of the rods in each bracket, spring elements coiled about said rods to yieldably restrict movement of said rods in said rockers, a coupling plate yieldably connected with said brackets, means for connecting the said circular member with said coupling plate, and the connections between said coupling plate and the tractor permitting freedom of movement of said coupling plate to relieve said circular member and trailer of tortional strain.

8. A tractor hitch including a circular plate adapted to be secured to a trailer, rockers mounted upon the tractor, brackets yieldably supported upon said rockers and adapted for vertical movement, rods secured to said brackets, a coupling plate movably mounted upon said rods, and means for connecting said circular plate to said coupling plate and permitting freedom of movement of said coupling plate to relieve said circular plate and trailer of tortional strain.

9. A tractor hitch including a member adapted to be secured to a trailer, rockers pivotally connected with the tractor, brackets yieldably mounted upon said rockers and adapted for vertical movement, a rod secured to each of said brackets, a coupling plate movably mounted upon said rods, spring elements interposed between the connections of said coupling plate with said rods and said brackets to cushion the load in either direction, and means for connecting said element to said coupling plate, the yieldable connections between the coupling plate and the tractor permitting freedom of movement of said coupling plate to relieve the forward end of the trailer of tortional strain.

10. A tractor hitch including a member adapted to be secured to a trailer, an element adapted to rock upon the tractor and having means for connection therewith, said means comprising oppositely arranged brackets having rockers mounted thereon, connections between said brackets to relieve the tractor of tensional strain, and means to connect the member and element to maintain the member in normal position and to permit relative pivotal movement upon turning travel of the tractor.

11. A tractor hitch including a pair of draft beams, a circular plate secured to the forward ends thereof, said draft beams having their intermediate portions pivotally connected with a trailer frame and having their rear portions yieldably attached thereto, rockers mounted upon the tractor, a coupling plate yieldably supported upon said rockers and adapted for vertical movement, and means for connecting said circular plate and said coupling plate and permitting freedom of movement of said coupling plate to relieve said circular plate and trailer of tortional strain.

12. A tractor hitch including a pair of draft beams, a circular plate secured to the forward ends thereof, said draft beams having their intermediate portions pivotally connected with a trailer and held against oscillation by spring elements, rockers mounted upon the tractor, a yieldably supported coupling plate attached to said rockers, and means for connecting said circular plate, and said coupling plate and permitting freedom of movement of said coupling plate to relieve said circular plate and trailer of tortional strain.

In witness whereof, I have hereunto set my hand this 7th day of May, 1925.

EDWARD R. GREER.